United States Patent Office 2,838,563
Patented June 10, 1958

2,838,563
ALKANOIC ACID SALTS OF (BICYCLOHEXYL)-4-AMINE

Harry F. Brust, Midland, Mich., assignor to The Dow Chemical Company, Midland, Mich., a corporation of Delaware No Drawing. Application February 7, 1957
Serial No. 638,673

4 Claims. (Cl. 260—501)

The present invention is directed to the alkanoic acid salts of (bicyclohexyl)-4-amine having the formula

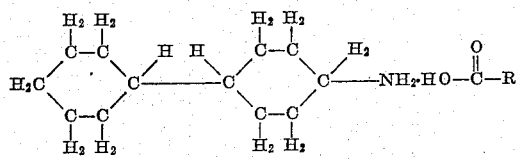

In this and succeeding formulae, R represents hydrogen, lower-alkyl or chloro lower-alkyl. The expression "lower-alkyl" is employed in the present specification and claims to refer to the alkyl radicals containing from 1 to 4 carbon atoms, inclusive. These compounds are crystalline solids somewhat soluble in many organic solvents and water. They have been found to be active as parasiticides and are adapted to be employed as the active toxic constituents of compositions for the control of many pests such as *Alternaria solani*.

The new compounds may be prepared by reacting (bicyclohexyl)-4-amine with an alkanoic acid having the formula $$HO-\overset{O}{\underset{\|}{C}}-R$$

such as formic acid, acetic acid, propionic acid, butyric acid, valeric acid, chloroacetic acid, dichloroacetic acid, trichloroacetic acid, 2,2-dichloropropionic acid, 2,2,3-trichloropropionic acid, 2,2-dichlorobutyric acid, 2,2,3-trichlorobutyric acid, 2,2-dichlorovaleric acid and 2,2,3-trichlorovaleric acid. The reaction may be carried out in the presence of a solvent inert under the conditions of the reaction such as dioxane, benzene or diethyl ether. The reaction is somewhat exothermic and proceeds smoothly at the temperature range of from 0° to 75° C. with the formation of the desired salt product. The temperature may be controlled by regulating the rate of contacting the reactants and by external cooling. In a preferred method of operation, the reaction is carried out at a temperature of from 0° to 40° C. Good results are obtained when employing substantially equimolecular proportions of the reactants.

In carrying out the reaction, the (bicyclohexyl)-4-amine and alkanoic acid are mixed or otherwise blended together at the contacting temperature range. In a convenient method of operation, the contacting of the reactants is carried out in an inert solvent. During the reaction, the desired salt product precipitates in the reaction mixture as a crystalline solid. Upon completion of the reaction as is evidenced by the substantial cessation of the formation of precipitate, the reaction mixture may be cooled and filtered to obtain the desired salt product. The product may be purified by recrystallization from suitable organic solvents.

The (bicyclohexyl)-4-amine employed as a starting material in the present invention occurs in two isomeric forms known as the alpha and beta isomers. These two isomers may be prepared by known methods. In such methods, cyclohexylcyclohexanol is dehydrogenated over a copper catalyst at 300° C. to form cyclohexylcyclohexanone, and this product thereafter ammoniated to form a 4-cyclohexylcyclohexanone imine. The latter is thereafter hydrogenated over a nickel catalyst at 60° C. and 75 pounds pressure per square inch to give a reaction mixture containing about equal amounts of the alpha and beta isomers of the (bicyclohexyl)-4-amine. The hydrogen chloride salt of the beta isomer of the amine is soluble in chloroform while the hydrogen chloride salt of the alpha isomer of the amine is substantially insoluble in chloroform. Thus, the isomeric amines may be separated in the form of their hydrogen chloride salts, and the salts thereafter converted to the free amine. The hydrogen chloride salts of the alpha and beta isomers of the amine melt at 295°–300° C. and 228°–232° C., respectively, while the alpha isomer of the amine melts at 58°–62° C. and the beta isomer of the amine melts at 32° C.

The following examples illustrate the invention but are not to be construed as limiting:

*Example 1.—Acetic acid salt of (bicyclohexyl)-4-amine α-isomer*

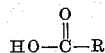—NH$_2$·HO$\overset{O}{\underset{\|}{C}}$—CH$_3$ 8.7 grams (0.145 mole) of acetic acid was added portionwise to 20 grams (0.115 mole) of (bicyclohexyl)-4-amine α-isomer dissolved in 100 milliliters of diethyl ether. The addition was carried out with stirring and external cooling and at a temperature of from 10° to 20° C. During the addition, a precipitate formed in the reaction mixture. Upon completion of the reaction as evidenced by substantial cessation of precipitate formation, the reaction mixture was filtered to separate an acetic acid salt of (bicyclohexyl)-4-amine α-isomer product as a crystalline solid. This product was found to melt at 186°–193° C.

*Example 2.—Formic acid salt of (bicyclohexyl)-4-amine α-isomer*

—NH$_2$·HOCH 5.0 grams (0.109 mole) of formic acid dissolved in 50 milliliters of diethyl ether was slowly added portionwise to 18.1 grams (0.10 mole) of (bicyclohexyl)-4-amine α-isomer dissolved in 150 milliliters of diethyl ether. The addition was carried out with cooling and at a temperature of from 20° to 30° C. During the addition, a precipitate formed in the reaction mixture. Upon completion of the reaction, as evidenced by the substantial cessation of the formation of precipitate, the reaction mixture was filtered to separate a formic acid salt of (bicyclohexyl)-4-amine α-isomer product as a crystalline solid. This product was found to melt at 195°–197° C.

*Example 3.—2,2-dichloropropionic acid salt of (bicyclohexyl)-4-amine α-isomer*

16 grams (0.115 mole) of 2,2-dichloropropionic acid was slowly added portionwise at room temperature to 20 grams (0.115 mole) of (bicyclohexyl)-4-amine α-isomer dissolved in 100 milliliters of diethyl ether. The reaction proceeded smoothly during the addition with the formation of a white solid which precipitated from the reaction mixture. Upon cessation of the formation of the precipitate, the reaction mixture was filtered to obtain a 2,2-dichloropropionic acid salt of (bicyclohexyl)-4-amine α-isomer product. This product was found to melt at 225° C.

*Example 4.—2,2-dichloroisovaleric acid salt of (bicyclohexyl)-4-amine β-isomer*

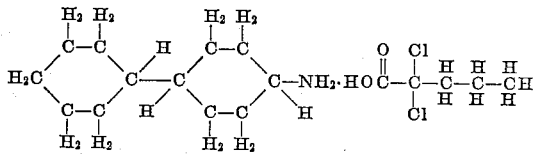

1.0 mole of 2,2-dichloroisovaleric acid is slowly added portionwise at room temperature to 1.0 mole of (bicyclohexyl)-4-amine β-isomer dissolved in 100 milliliters of diethyl ether. The reaction proceeds smoothly during the addition with the formation of a precipitate in the reaction mixture. Upon cessation of the formation of precipitate, the reaction mixture is filtered to obtain a 2,2-dichloroisovaleric acid salt of (bicyclohexyl)-4-amine β-isomer product. 2,2-Dichloro-isovaleric acid salt of (bicyclohexyl)-4-amine β-isomer has a molecular weight of 349.

In a similar manner, other alkanoic acid salts of bicyclohexyl-4-amine may be prepared as follows:

The 2,2,3-trichloropropionic acid salt of (bicyclohexyl)-4-amine β-isomer by reacting 2,2,3-trichloropropionic acid with (bicyclohexyl)-4-amine β-isomer.

The normal-butyric acid salt of (bicyclohexyl)-4-amine β-isomer by reacting normal-butyric acid with (bicyclohexyl)-4-amine β-isomer.

The 2,2-dichlorobutyric acid salt of (bicyclohexyl)-4-amine α-isomer by reacting 2,2-dichlorobutyric acid with (bicyclohexyl)-4-amine α-isomer.

The trichloroacetic acid salt of (bicyclohexyl)-4-amine α-isomer by reacting trichloroacetic acid with (bicyclohexyl)-4-amine α-isomer.

The new compounds of the present invention have been tesetead and found effective as parasiticides. For such use, the products may be dispersed on an inert finely divided solid and employed as dusts. Also, such mixtures may be dispersed in water with the aid of a wetting agent, and the resulting aqueous suspensions employed as sprays. In other procedures, the products may be employed as constituents of oil-in-water emulsions, or water dispersions with or without the addition of wetting, dispersing or emulsifying agents. In representative operation, foliar applications of aqueous spray compositions containing 0.06 pound of the formic acid salt of (bicyclohexyl)-4-amine α-isomer per 100 gallons of ultimate mixture have been found to give substantially complete controls of tomato early blight, *Alternaria solani*.

I claim:

1. An alkanoic acid salt of (bicyclohexyl)-4-amine having the formula

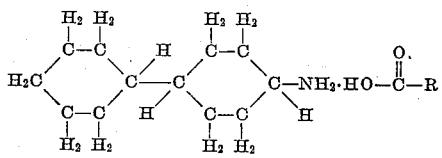

wherein R represents a member of the group consisting of hydrogen, lower-alkyl and chloro lower-alkyl.

2. Acetic acid salt of (bicyclohexyl)-4-amine α-isomer.
3. Formic acid salt of (bicyclohexyl)-4-amine α-isomer.
4. 2,2-Dichloropropionic acid salt of (bicyclohexyl)-4-amine α-isomer.

No references cited.